US010062051B2

(12) United States Patent
Waldman et al.

(10) Patent No.: US 10,062,051 B2
(45) Date of Patent: Aug. 28, 2018

(54) ESTIMATION OF THIRD PARTY INVENTORY

(71) Applicant: Curbside, Inc., Palo Alto, CA (US)

(72) Inventors: Jaron I. Waldman, Palo Alto, CA (US); Lik Harry Chen, San Jose, CA (US); Denis Laprise, Palo Alto, CA (US)

(73) Assignee: CURBSIDE, INC., Palo Alto, CA (US)

( * ) Notice: Subject to any disclaimer, the term of this patent is extended or adjusted under 35 U.S.C. 154(b) by 681 days.

(21) Appl. No.: 14/578,253

(22) Filed: Dec. 19, 2014

(65) Prior Publication Data

US 2016/0180284 A1 Jun. 23, 2016

(51) Int. Cl.
*G06Q 30/00* (2012.01)
*G06Q 10/08* (2012.01)
*G06Q 30/06* (2012.01)

(52) U.S. Cl.
CPC ....... *G06Q 10/087* (2013.01); *G06Q 30/0619* (2013.01); *G06Q 30/0635* (2013.01)

(58) Field of Classification Search
CPC ......................................... G06Q 30/06–30/08
USPC ............................................... 705/26.1–27.2
See application file for complete search history.

(56) References Cited

U.S. PATENT DOCUMENTS

| 5,237,496 | A | 8/1993 | Kagami et al. |
| 6,993,498 | B1 | 1/2006 | Deaton et al. |
| 7,222,786 | B2 | 5/2007 | Renz et al. |
| 7,904,975 | B2 | 3/2011 | Kruglikov et al. |
| 7,979,325 | B2 | 7/2011 | Kataoka et al. |
| 8,335,722 | B2 | 12/2012 | Lee et al. |
| 8,392,261 | B2 | 3/2013 | Lee et al. |
| 8,566,137 | B1 | 10/2013 | Cabrera et al. |
| 8,738,461 | B1 | 5/2014 | Chu et al. |

(Continued)

FOREIGN PATENT DOCUMENTS

KR   1020020092978 A   12/2002

OTHER PUBLICATIONS

"Ligand Announces Preliminary Revenue Estimates for Third Quarter of Fiscal 2005, Preliminary Results for First and Second Quarters of Fiscal 2005 and Filing of 10-K and Audited Results for Fiscal 2004, 2003, and 2002" (Business Wire, Nov. 18, 2005) (Year: 2005).*

(Continued)

*Primary Examiner* — Ethan D Civan
(74) *Attorney, Agent, or Firm* — Nicholson De Vos Webster & Elliott LLP

(57) ABSTRACT

Exemplary methods, apparatuses, and systems receive a browsing request to view an item offered by a first third party retailer. An estimated inventory value for the item at the first third-party retailer is retrieved. The estimated inventory value is maintained using a combination of a history of purchases of the item and a history of inventory values for the item received from one or more third party retailers. A representation of the item as being available for purchase is transmitted to a user device based upon the estimated inventory value for the item. In response to receiving a request to initiate a purchase of the item, a request for a current inventory value for the item is transmitted to a retail server. The purchase of the item is initiated in response to determining the item is available based upon the received current inventory value.

18 Claims, 5 Drawing Sheets

(56) References Cited

U.S. PATENT DOCUMENTS

| | | |
|---|---|---|
| 2003/0014317 A1 | 1/2003 | Siegel et al. |
| 2003/0078847 A1* | 4/2003 | Galli .................... G06Q 10/087 705/22 |
| 2006/0224439 A1* | 10/2006 | Smith .............. G06Q 10/06375 705/7.35 |
| 2007/0124009 A1 | 5/2007 | Bradley et al. |

OTHER PUBLICATIONS

International Search Report and Written Opinion for Application No. PCT/US2015/066768, dated May 4, 2016, 12 pages.

\* cited by examiner

ESTIMATION OF THIRD PARTY INVENTORY

FIELD

The various embodiments described herein relate to estimating the inventory of one or more items offered by one or more third party retailers. In particular, the embodiments relate to using an estimated inventory value to present an item in a browsing interface and obtaining an updated availability of the item in response to the initiation of the purchase of an item.

BACKGROUND

Online shopping extends the basic concepts of mail order shopping to the Internet. A user selects an item from a catalogue, places an order, and receives delivery of the ordered item via the mail. Waiting for delivery, paying for postage, and/or being physically present to receive some orders, however, may be too much of a burden for the purchase of a number of goods. In addition to or in lieu of delivery, some businesses allow users to order items for pickup at a local store. For example, a website may enable a user to search for and select a store location, place an order for an item, and pickup the order by presenting a printed copy of a receipt, a credit card, etc. The user experience of shopping for items on store websites or across multiple store mobile device applications often leads to a poor customer experience. Additionally, even if a central shopping platform is provided for multiple retailers, tracking and maintaining product data across the different retailers and retail locations is challenging. It is especially challenging when dealing with data that may change rapidly, such as the inventory of items.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein facilitate the maintenance and utilization of an estimation of product availability at one or more third party retailers. For example, a shopping platform receives a browsing request to view an item offered by a local third party retailer. The shopping platform retrieves an estimated inventory value for the item. The estimated inventory value is maintained by the shopping platform using a combination of a history of purchases of the item via the shopping platform and a history of inventory values for the item received from one or more third party retailers. The shopping platform transmits a representation of the item as being available for purchase to a user device based upon the estimated inventory value for the item. In response to receiving a request to initiate a purchase of the item, the shopping platform transmits a request to a retail server for a current inventory value for the item. The shopping platform initiates the purchase of the item in response to determining the item is available based upon the received current inventory value. As a result, the shopping platform's use of estimated inventory values generates browsing results quickly and without the burden of constantly crawling or otherwise requesting inventory values from retail servers. Additionally, the shopping platform may provide the estimated inventory values to third party retailers to assist the third party retailers in inventory management. Furthermore, the shopping platform may utilize the estimated inventory values to notify users of the likelihood of an upcoming low or depleted inventory of one or more items, e.g., to encourage the users to purchase the item(s) prior to the item(s) becoming unavailable.

Figure 1:
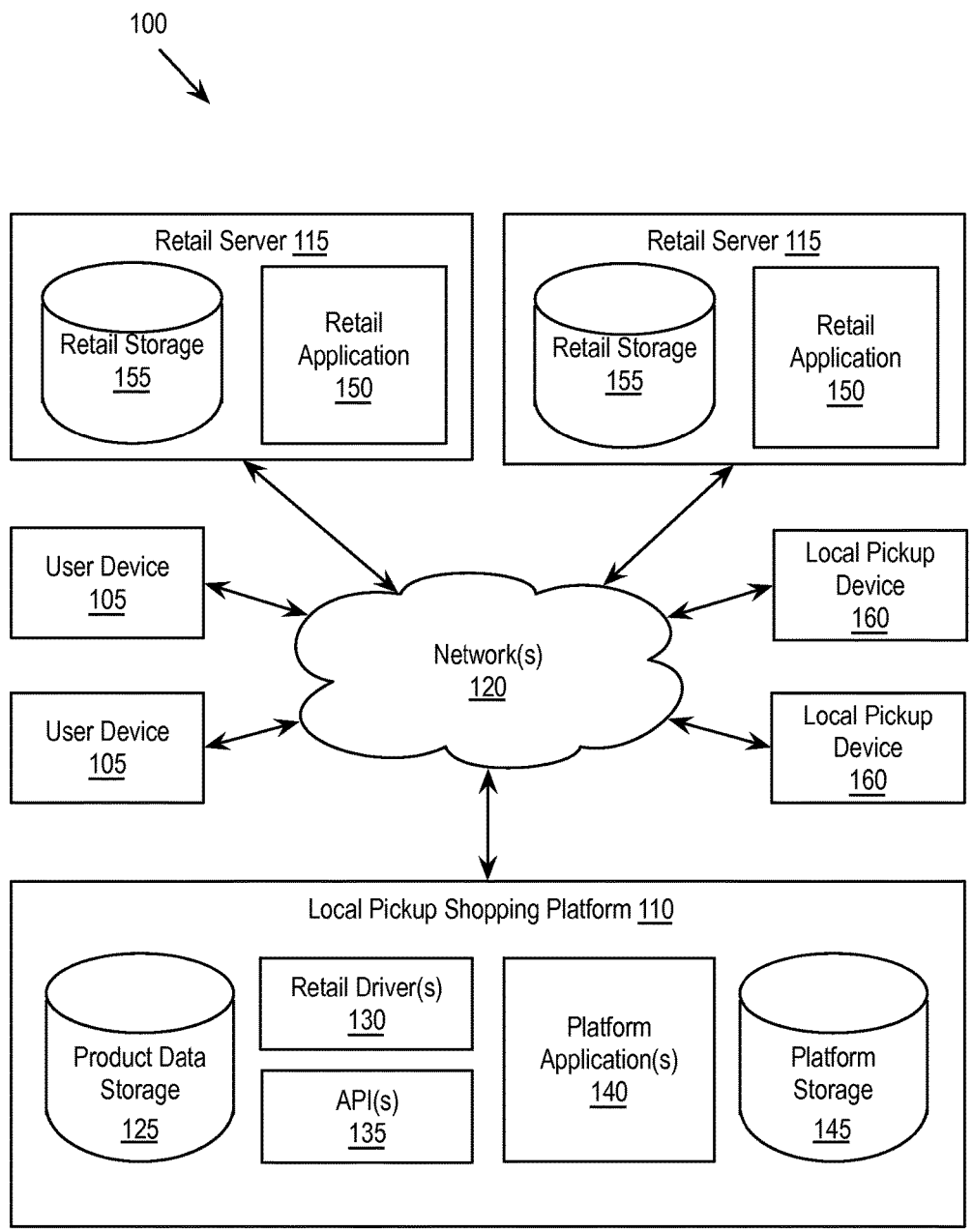
FIG. 1 illustrates, in block diagram form, an exemplary local pickup shopping network.

FIG. 1 illustrates, in block diagram form, exemplary local pickup shopping network 100. Local pickup shopping network 100 includes user devices 105, local pickup shopping platform 110, retail server(s) 115, and local pickup device(s) 160 coupled to one or more networks 120. A user interacts with the local pickup shopping platform 110 using a user device 105, such as a personal computer, tablet, or a mobile phone. For example, a user device 105 communicates with local pickup shopping platform 110 via an application such as a web browser or dedicated application. Typical interactions between a user device 105 and local pickup shopping platform 110 include a user device 105 browsing items available for ordering and local pickup as presented by local pickup shopping platform 110, submitting an order to local pickup shopping platform 110, being notified by local pickup shopping platform 110 that an order is ready for pickup, receiving local pickup and location sharing information parameters from local pickup shopping platform 110, transmitting infrequent and frequent location updates to location pickup shopping platform 110 based upon a proximity of the user device 105 to the pickup location, etc.

While the examples set forth herein describe the local pickup of items, embodiments of the invention are not limited to local pickup. For example, the estimation of inventory of one or more items offered by a third party retailer, the use of the estimated inventory in a browsing interface, and obtaining current availability of the item in response to the initiation of the purchase of an item apply to local pickup embodiments as well as non-local embodiments (e.g., delivery by mail) of shopping platform 110.

Local pickup shopping platform 110 includes product data storage 125, retail drivers 130, one or more application programming interfaces (API's) 135, one or more platform application(s) 140, and platform storage 145. Product data storage includes an index of products that may be ordered by users. For example, the product index may include product names, product identifiers (e.g., stock keeping unit (SKU) or a similar identifier), product categories, product descriptions, product images, stores that offer the product, product pricing (e.g., at each store), an estimated inventory value for the product (e.g., at each store), a history of inventory values reported by retailers (e.g., a time series of product inventory values received from each store/location), an order history of products over time (e.g., a time series of products ordered by store/location), etc.

Local pickup shopping platform 110 utilizes retail drivers 130 to obtain product index data. For example, each retailer may store product index data in a corresponding retail storage device 155 and may provide a different interface by which product index data is obtained and orders are fulfilled. Exemplary retailer interfaces include a consumer-facing website that presents inventory available at physical store locations, a database or other data storage 155 that is either directly accessible or indirectly accessible to business partners, and/or a product data feed pushed via retail application 150 and/or retail storage 155. As a result, platform application 140 may request product index data in a uniform manner and retail drivers 130 process the requests in a manner that is specific to individual retail servers 115. In one embodiment, local pickup shopping platform 110 utilizes a driver 130 to crawl one or more retail websites to obtain product index data or to otherwise request product index data from the one or more retail websites. In another embodiment, local pickup shopping platform 110 utilizes a driver 130 to download and parse a file storing the product index data.

One or more APIs 135 enable a client application running on user device 105 to query or otherwise access product data storage 125 and platform storage 145. For example, user device 105 may submit requests to platform application 140 via API 135 to browse, search for, and order products available for local pickup. Exemplary requests may include a location (e.g., to determine nearby businesses), product name search terms, product category search terms, business name/category search terms, selection of a product/category/business, etc. In response to these requests, platform application 140 provides user device 105 with images and/or descriptions of products based upon estimated and/or actual inventory data, e.g., from product data storage 125.

Additionally one or more APIs 135 enable local pickup device 160 to query or otherwise access product data storage 125 and platform storage 145. For example, local pickup device 160 may communicate with platform application 140 via API 135 to determine which orders are ready, update order readiness status, request/receive location updates for user device 105, and confirm pickup of an order.

In one embodiment, one or more platform applications 140 manage the submission of orders and the collection of product index data, e.g., via commands passed to retail drivers 130. Additionally, platform application(s) 140 manage communications with user devices 105 via API(s) 135, e.g., to facilitate browsing and purchase of items based upon inventory values as described herein with reference to FIGS. 2A, 2B, and 3.

Platform storage 145 stores user account data. Exemplary user account data includes user preferences/settings, user profile data, user order history data, user payment data, etc.

Figure 2A:
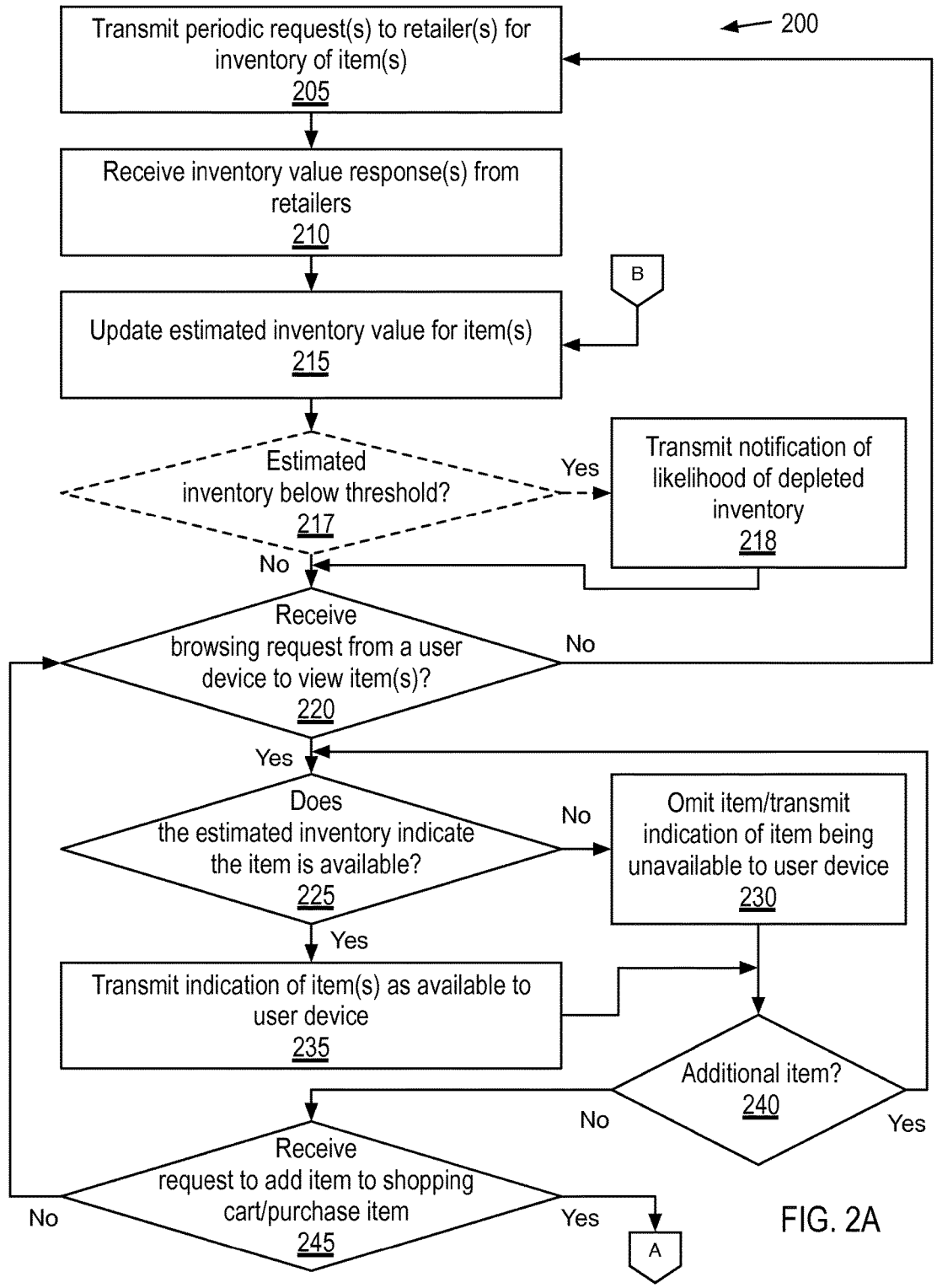
FIGS. 2A-2B illustrate a flow chart of an exemplary method of maintaining and utilizing an estimation of product availability at one or more third party retailers.
Figure 2B:
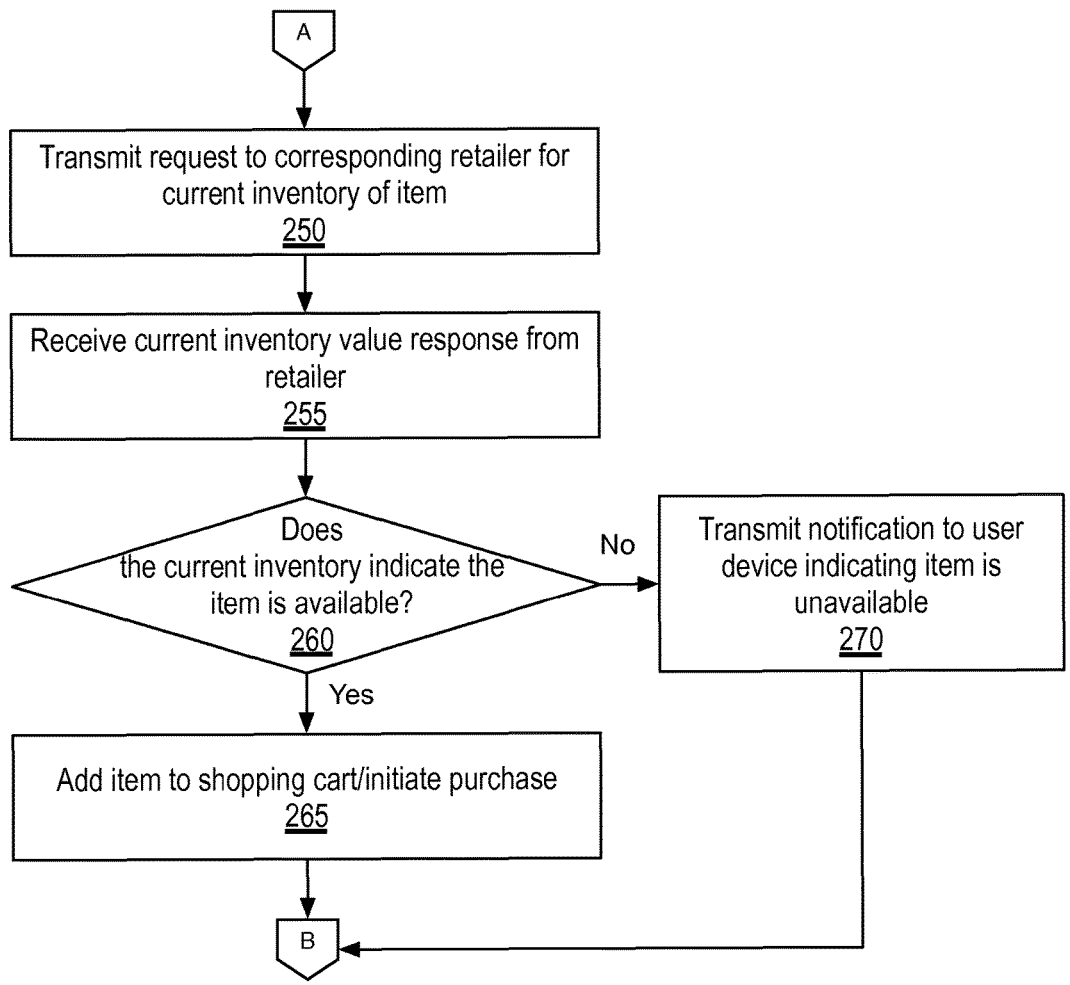

FIGS. 2A-2B illustrate a flow chart of exemplary method 200 of maintaining and utilizing an estimation of product availability at one or more third party retailers. At block 205, shopping platform 110 transmits request(s) to one or more retailer servers 115 for inventory values for items offered by the corresponding retailers and presented to user devices 105 via shopping platform 110. For example, shopping platform 110 may utilize a driver 130 to periodically crawl one or more retail websites or otherwise obtain product index data as described above. In one embodiment, shopping platform 110 utilizes driver 130 to transmit requests for individual items. For example, shopping platform 110 may request inventory data for different items or different groups/classes of items at different intervals. Similarly, shopping platform 110 may request inventory data from different retailers or different locations of the same retailer at different intervals.

In one embodiment, the interval(s) at which shopping platform 110 requests inventory values are set and/or updated manually. In another embodiment, shopping platform 110 automatically sets and/or updates the interval(s). For example, as shopping platform 110 creates and maintains a history of inventory values and purchases of items, shopping platform 110 may calculate the maximum, mean, average, seasonal, and/or other inventory depletion rates for items across retail locations and within individual retail locations. Using the calculated depletion rates, shopping platform 110 may select a corresponding interval to request an update on the inventory of items. For example, shopping platform 110 may set the inventory request interval for an item to a time period that corresponds to 75% (or another percentage) of the time an inventory would be depleted at the maximum inventory depletion rate as determined from the inventory and purchase history for that item. Additionally, shopping platform 110 may determine from the history of inventory values if an item has a regular restocking interval. For example, the history of inventory values may indicate that an item is restocked to the same inventory value on a weekly basis. Shopping platform 110 may then set the interval to request an update on the inventory of an item to occur one or multiple times during the determined restocking interval.

Additionally, the frequency at which shopping platform 110 requests an inventory value for a particular item may depend upon the use of inventory values for another item, a class of items, or the item at another retail location as a representative of the inventory value for the particular item. For example, shopping platform 110 may utilize items and/or stores with similar inventory/purchase histories as representative samples for one or more other items/stores. As a result of the representative sampling, shopping platform 110 may use a less frequent interval for individual items or stores. Representative sampling of inventory values is described further with reference to FIG. 3.

In one embodiment, shopping platform 110 requests inventory value(s) at a regular periodic interval. For example, shopping platform 110 may request an inventory value for an item at a particular time each day. In another embodiment, shopping platform 110 requests inventory value(s) after a threshold amount of time has passed following a previous request. For example, as described herein, shopping platform 110 may request an inventory value or otherwise receive an indication of an inventory value for an item upon initiation of a purchase of the item. In such an embodiment, each request for an inventory value (whether triggered as a periodic request or in response to the initiation of a purchase) resets a timer to the threshold period of time. Upon expiration of the threshold period of time, shopping platform 110 requests an updated inventory value. As a result, the more often an item is purchased, the less often shopping platform 110 initiates a periodic inventory value request.

At block 210, shopping platform 110 receives the inventory value response(s) from the one or more retail servers 115. An inventory value for an item may be an indication of a number of the item a retailer/retail location has in stock or simply whether or not the item is in stock.

At block 215, shopping platform 110 updates an estimated inventory value for each item that corresponds to the received inventory value(s). For example, shopping platform 110 creates a new entry in a time series data structure for each item including an identifier for the item, the received inventory value, and a time at which the inventory value was received. In one embodiment, the estimated inventory value for an item is then set to the currently received inventory value and decremented with each subsequent purchase of the item. Additionally, the estimated inventory value for an item may be decremented according to a calculated depletion rate based upon the inventory and/or purchase history of one or more of: the item, a class of items to which the item belongs, or a representative item with a similar purchase/inventory history. For example, shopping platform 110 may determine a product of the calculated depletion rate and the amount of time that has passed following the last receipt of an inventory value. The determined product reflects the number of the item estimated to have been purchased following the last receipt of an inventory value. Accordingly, shopping platform 110 decrements the latest inventory value by the determined number of items purchased to determine an updated estimation of the inventory value.

In one embodiment, shopping platform 110 transmits estimated inventory values to one or more third party retailers or the third party retailer(s) otherwise access the estimated inventory value(s) via a network interface, web portal, etc. For example, shopping platform 110 may provide the estimated inventory values to third party retailers to assist the third party retailers in inventory management.

At block 217, shopping platform 110 optionally determines if the estimated inventory value for one or more items is below a corresponding threshold inventory value. For example, an estimated inventory value below the threshold inventory value may indicate that the inventory of the item is likely to deplete completely or before a restocking of the item is to occur. In one embodiment, the threshold inventory value is a dynamic value based upon a known or estimated restocking cycle. For example, a lower threshold inventory value may be used at a date immediately prior to a restocking of inventory, a higher threshold inventory value may used at a date immediate following the restocking of inventory, and the threshold inventory value may be scaled according to the days that fall in between restocking events. Alternatively, the threshold inventory value is a static value.

If estimated inventory value for an item is below a corresponding threshold inventory value, at block 218, shopping platform 110 transmits a notification corresponding to the determined likelihood of depleted inventory. In one embodiment, shopping platform 110 transmits a notification to one or more users. For example, shopping platform 110 may notify users to encourage purchases of the item prior to inventory depletion. In another embodiment, shopping platform 110 transmits a notification to one or more retailers. For example, shopping platform 110 may notify the retailer(s) to encourage an adjustment in inventory, ordering, or a supplemental restocking of the item to avoid inventory depletion.

If estimated inventory value for an item is below a corresponding threshold inventory value or if shopping platform 110 bypasses this optional determination, at block 220, shopping platform 110 determines if a browsing request from a user device 105 to view one or more items has been received. For example, a user device 105 may transmit a browsing request to shopping platform 110 in response to user input requesting a search for an item across shopping platform 110, to search items offered by a particular retailer, to present popular items at a particular retailer, to present popular items in a particular category, to present items previously/regularly purchased by the user, etc.

If a browsing request has not been received, method 200 returns to block 205 to continue with any periodic updates of inventory values. For example, shopping platform 110 may not receive a browsing request for an item between periodic inventory requests for the item. Additionally, method 200 may perform blocks 205-215 in parallel with the browsing and purchasing of items. Furthermore, an item may be the subject of multiple browsing and/or purchase requests in between periodic inventory requests, resulting an updated estimated inventory as described further below.

If a browsing request has been received, at block 225, shopping platform 110 determines the estimated availability of an item that corresponds to the browsing request. As described herein, the estimated availability for each item is based upon one or more of: the history of inventory values received from the retailer, the purchase history of the item (within shopping platform 110 or as provided by the retailer), a calculated depletion rate, representative sampling, etc.

If the item is estimated as being unavailable, at block 230, shopping platform 110 omits the item from the browsing interface or transmits an indication to the user device 105 that the item is unavailable. For example, shopping platform 110 may transmit an image of the item along with text stating that the item is out of stock or present the item in a manner such that it is not selectable for purchase. Presenting the item in such a manner may include omitting a graphical user interface object used to initiate a purchase of the item or removing the functionality of and changing the appearance of such an object.

If the item is estimated as being available, at block 235, shopping platform 110 transmits an indication to the user device 105 that the item is available. For example, shopping platform 110 may transmit an image or other representation of the item along with text stating that the item is in stock, a quantity of the item that is available, or otherwise present the item in a manner such that it is selectable for purchase.

At block 240, shopping platform 110 determines if an additional item remains to be evaluated for availability. If an additional item remains, method 200 returns to block 225. When no additional items remain, at block 245, shopping platform 110 determines if a request has been received to add an item to an electronic shopping cart or otherwise initiate the purchase of the item.

If a request has not been received to add an item to an electronic shopping cart or otherwise initiate the purchase of the item, method 200 returns to block 220. If a request has been received to add an item to an electronic shopping cart or otherwise initiate the purchase of the item, method 200 proceeds via off page connector A to block 250.

At block 250, in response to receiving the request to initiate the purchase of the item, shopping platform 110 transmits a request to the corresponding retail server 115 for the current inventory status of the item for which the add to cart/purchase request was received. At block 255, shopping platform 110 receives the inventory value response from the retail server 115. As a result, shopping platform 110 is able to confirm the estimated inventory value (i.e., that the item is available for purchase) prior to executing the request to add the item to an electronic shopping cart or otherwise initiate the purchase.

At block 260, shopping platform 110 determines whether or not the current inventory value received from retail server 115 indicates that the item is available. For example, the response from retail server 115 may include a positive, non-zero number as the inventory value for the item or otherwise indicate that the item is available for purchase.

If the item is available, at block 265, shopping platform 110 adds the item to the electronic shopping cart or otherwise initiates the purchase of the item and method 200 proceeds via off page connector B to block 215. For example, if the user purchased the item, shopping platform 110 creates a new entry in the inventory time series data structure and updates the estimated inventory to reflect the last-received inventory value from retail server 115. Additionally, shopping platform 110 may update the estimated inventory to reflect the purchase.

If the item is not available, at block 270, shopping platform 110 transmits a notification to the user device 105 indicating that the item is currently out of stock or otherwise not available and method 200 proceeds via off page connector B to block 215. For example, shopping platform 110 creates a new entry in the inventory time series data structure and updates the estimated inventory to reflect the last-received inventory value from retail server 115. In one embodiment, the notification includes a request to recommend or automatic recommendation of another retail location that has or is estimated to have the item in stock.

Figure 3:
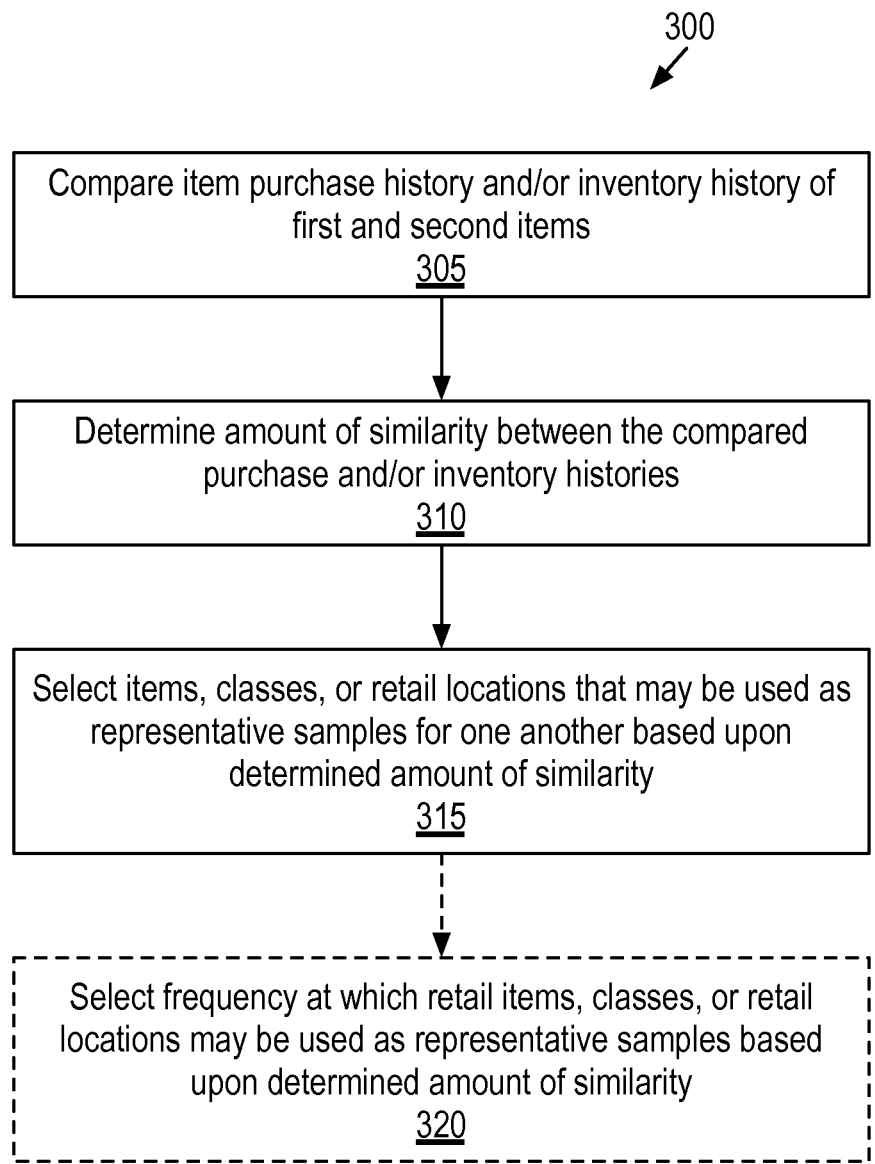
FIG. 3 is a flow chart illustrating an exemplary method of selecting retail locations and/or items that may be used as representative samples for one another in estimating item availability.

FIG. 3 is a flow chart illustrating exemplary method 300 of selecting retail locations and/or products that may be used as representative samples for one another in estimating item availability. At block 305, shopping platform 110 compares the product purchase history and/or inventory value history of a first item with the purchase history and/or inventory value history of a second item. The first and second items may be different items within a single retail location, different items within the same class or category of items (e.g., electronics) within a single retail location, different items within the same class or category of items across different retail locations, or the same item at two different retail locations.

In one embodiment, shopping platform 110 compares the product purchase history and/or inventory value histories of a group of items with the product purchase history and/or inventory value histories of another group of items. For example, shopping platform 110 may compare an entire class/category of items from one retail location to the same class/category of items from another retail location. As another example, shopping platform 110 may compare the entire inventory of items sold via shopping platform 110 from one retail location to the entire inventory of items sold via shopping platform 110 from another retail location.

At block 310, shopping platform 110 determines an amount of similarity between the compared purchase and/or inventory value histories. In one embodiment, shopping platform 110 determines a percentage of similarity between the histories, an amount of deviation between the histories, or another metric of comparison. For example, two products may be determined to have a similar inventory pattern if the products share similar feature properties. Exemplary feature properties include brand, price, product type (e.g., disposable diapers, instant coffee, etc.), product category (e.g., electronics, automotive, etc.), seasons and holidays, shelf life, manufacturers, delivery schedules, end-of-life, end-of-sale, popularity (e.g., customer review, ratings, etc.), in-store inventory, purchase history, etc. A product similarity score for two products may be based upon the similarities in the features of the products. For example, feature properties may be mapped to a numeric system in which similarity between features is based upon a comparison of the numeric values. In one embodiment, the comparison of product features is performed by calculating the Euclidean distance between the numeric values. In one embodiment, one or more features may be determined to be more reliable indicators of similarity between products and, accordingly, are weighted to give a greater influence in the determination of the product similarity score.

At block 315, shopping platform 110 selects items, classes, or retail locations that may be used as representative samples for one another based upon determined amount of similarity. In one embodiment, two items with histories within a threshold amount of similarity may be selected to be representative of one another. For example, items with histories that are at least 95% similar or within a 5% deviation of one another may be selected to be representative of one another. Similarly, two groups of items, classes/categories of items, or two retail locations may be determined to have histories within a threshold amount of similarity and be selected to be representative of one another.

As a result, shopping platform 110 is able to transmit periodic requests to retailers less often. For example, if shopping platform 110 would request inventory values for each of two separate items on a daily basis and shopping platform 110 determines that the items have similar inventory/purchase histories, shopping platform 110 may reduce the number of requests for inventory values by using the inventory value of one item as a representative inventory value for the other item. In such an embodiment, shopping platform 110 may alternate requests between the items. For example, instead of requesting inventory values for both items at the end of each periodic cycle/time threshold (each day), shopping platform 110 may request the inventory value for the first item at the end of a first periodic cycle/time threshold (the first day) and request the inventory value for the second item at the end of the second periodic cycle/time threshold (the second day). Additionally, with multiple items having inventory values serving as representatives of one another, there is an increased likelihood that purchases will occur within the group of multiple items (as compared to the frequency of purchases of each individual item), thereby providing more recent requests for inventory values from the corresponding retail servers.

At block 320, shopping platform 110 optionally selects a frequency at which retail items, classes, or retail locations may be used as representative samples based upon determined amount of similarity. In one embodiment, shopping platform 110 maps similarity values to frequency values stored in a database or other data structure. For example, as the similarity increases within the range of 90-100%, the items/classes/retail locations are more trustworthy as representatives of one another and may be used more frequently as representatives. On the other hand, lesser similarity values may correlate to shopping platform 110 requesting inventory values from each individual item/class/retail location more often.

Figure 4:
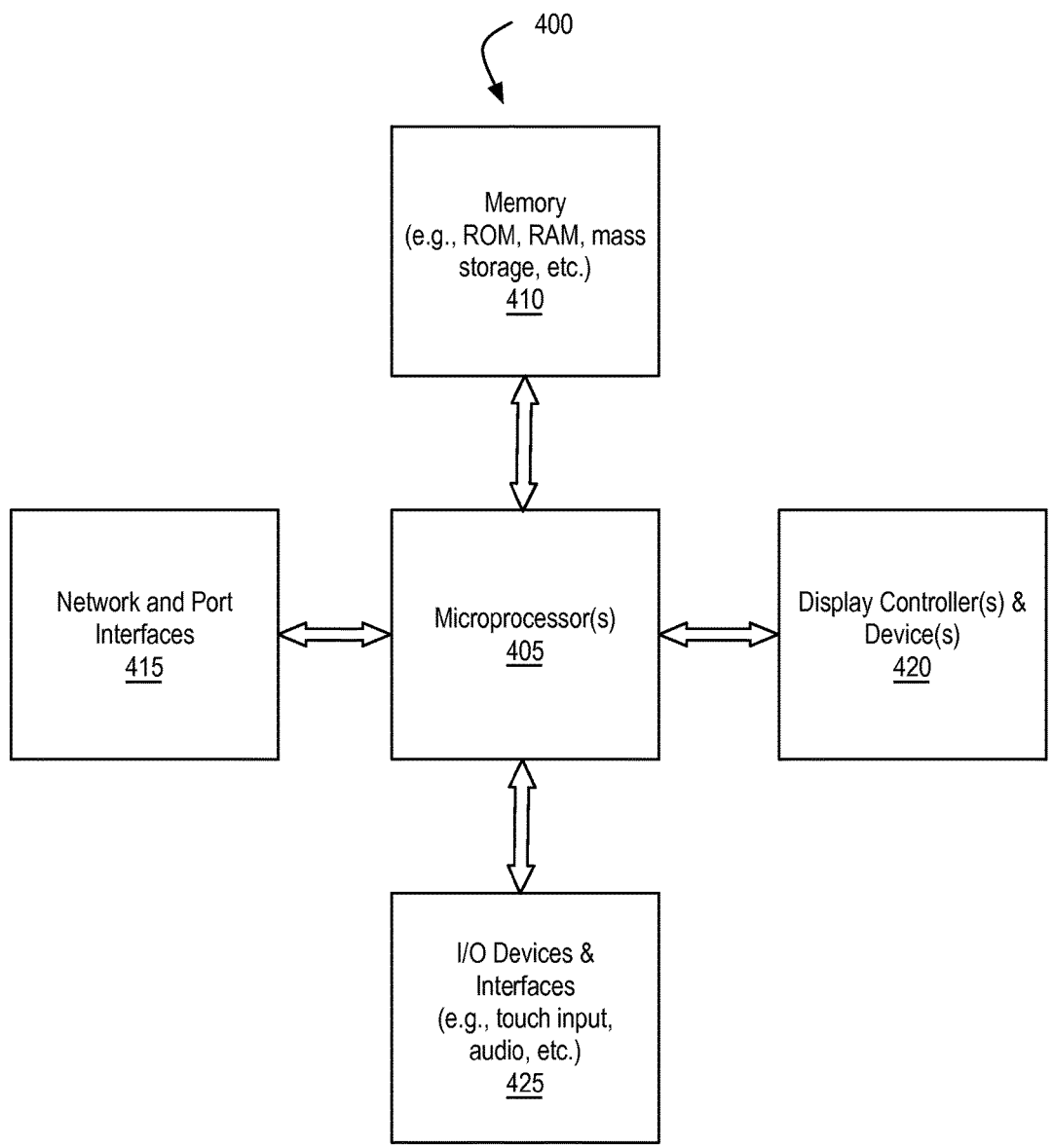
FIG. 4 illustrates, in block diagram form, an exemplary processing system to the maintenance and utilization of an estimation of product availability at one or more third party retailers.

FIG. 4 illustrates, in block diagram form, exemplary processing system 400 to facilitate the maintenance and utilization of an estimation of product availability at one or more third party retailers. Data processing system 400 includes one or more microprocessors 405 and connected system components (e.g., multiple connected chips). Alternatively, data processing system 400 is a system on a chip.

Data processing system 400 includes memory 410, which is coupled to microprocessor(s) 405. Memory 410 may be used for storing data, metadata, and programs for execution by the microprocessor(s) 405. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory.

Data processing system 400 includes network and port interfaces 415, such as a port, connector for a dock, or a connector for a USB interface, FireWire, Thunderbolt, Ethernet, Fibre Channel, etc. to connect the system 400 with another device, external component, or a network. Exemplary network and port interfaces 415 also include wireless transceivers, such as an IEEE 802.11 transceiver, a GPS transceiver/transponder, an infrared transceiver, a Bluetooth transceiver, a wireless cellular telephony transceiver (e.g., 2G, 3G, 4G, etc.), or another wireless protocol to connect data processing system 400 with another device, external component, or a network and receive stored instructions, data, tokens, etc.

Data processing system 400 also includes display controller and display device 420 and one or more input or output ("I/O") devices and interfaces 425. Display controller and display device 420 provides a visual user interface for the user. I/O devices 425 allow a user to provide input to, receive output from, and otherwise transfer data to and from the system. I/O devices 425 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 4.

Data processing system 400 is an exemplary representation of one or more of user device(s) 105, shopping platform 110, retail server 115, and local pickup device 160 described above. Data processing system 400 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 400 may be a network computer, server, or an embedded processing device within another device or consumer electronic product. As used herein, the terms computer, device, system, processing system, processing device, and "apparatus comprising a processing device" may be used interchangeably with data processing system 400 and include the above-listed exemplary embodiments.

Additional components, not shown, may also be part of data processing system 400, and, in certain embodiments, fewer components than that shown in FIG. 4 may also be used in data processing system 400. It will be apparent from this description that aspects of the inventions may be embodied, at least in part, in software. That is, computer-implemented methods 200 and 300 may be carried out in a computer system or other data processing system 400 in response to its processor or processing system 405 executing sequences of instructions contained in a memory, such as memory 410 or other non-transitory machine-readable storage medium. The software may further be transmitted or received over a network (not shown) via network interface device 415. In various embodiments, hardwired circuitry may be used in combination with the software instructions to implement the present embodiments. Thus, the techniques are not limited to any specific combination of hardware circuitry and software, or to any particular source for the instructions executed by data processing system 400.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
   receiving, by a shopping platform from a user device, a browsing request to view an item offered by a first third-party retailer;
   retrieving an estimated inventory value for the item at the first third-party retailer, wherein the shopping platform maintains the estimated inventory value for the item using a combination of a history of purchases of the item by users of the shopping platform and a history of inventory values for the item received from one or more third-party retailers, and wherein the shopping platform uses periodic inventory values for the item received from a second third-party retailer to determine the estimated inventory value for the item at the first third-party retailer;

transmitting, from the shopping platform to the user device, a representation of the item as being available for purchase based upon the estimated inventory value for the item;

receiving, by the shopping platform from the user device, a request to initiate a purchase of the item in response to the transmitted representation of the item;

in response to receiving the request to initiate the purchase of the item, transmitting, from the shopping platform to a retail server, a request for a current inventory value for the item;

receiving, by the shopping platform from the retail server, the current inventory value for the item; and initiating the purchase of the item in response to determining the item is available based upon the received current inventory value for the item.

2. The computer-implemented method of claim 1, wherein initiating the purchase of the item includes transmitting, from the shopping platform to the retail server, the request to purchase the item, the method further comprising:

updating the estimated inventory value for the item based upon the purchase of the item and the received current inventory value for the item.

3. The computer-implemented method of claim 1, wherein initiating the purchase of the item includes adding the item to an electronic shopping cart.

4. The computer-implemented method of claim 1, further comprising:

receiving, by the shopping platform from the user device, a request to initiate a purchase of another item;

transmitting, from the shopping platform to a retail server in response to the received request to initiate the purchase of the other item, a request for a current inventory value for the other item;

receiving, by the shopping platform from the retail server, the current inventory value for the other item; and transmitting a message to the user device indicating that the other item is unavailable based upon the received current inventory value for the other item.

5. The computer-implemented method of claim 1, wherein the history of inventory values for the item includes the inventory values obtained by the shopping platform regularly receiving the periodic inventory values for the item from the one or more third-party retailers.

6. The computer-implemented method of claim 1, wherein the shopping platform uses the periodic inventory values for the item received from the second third-party retailer in response to determining the first and second third-party retailers have similar histories of inventory values for the item.

7. The computer-implemented method of claim 1, wherein the shopping platform maintains the estimated inventory value for the item based upon periodic inventory values for another item.

8. The computer-implemented method of claim 1, further comprising:

determining that the estimated inventory for the item is below a threshold inventory value; and transmitting a notification to a user device corresponding to a likelihood of depleted inventory of the item.

9. A non-transitory computer-readable medium storing instructions which, when executed by one or more processors in a processing device, cause the processing device to perform a method comprising:

receiving, by a shopping platform from a user device, a browsing request to view an item offered by a first third-party retailer;

retrieving an estimated inventory value for the item at the first third-party retailer, wherein the shopping platform maintains the estimated inventory value for the item using a combination of a history of purchases of the item by users of the shopping platform and a history of inventory values for the item received from one or more third-party retailers, and wherein the shopping platform uses periodic inventory values for the item received from a second third-party retailer to determine the estimated inventory value for the item at the first third-party retailer;

transmitting, from the shopping platform to the user device, a representation of the item as being available for purchase based upon the estimated inventory value for the item;

receiving, by the shopping platform from the user device, a request to initiate a purchase of the item in response to the transmitted representation of the item;

in response to receiving the request to initiate the purchase of the item, transmitting, from the shopping platform to a retail server, a request for a current inventory value for the item;

receiving, by the shopping platform from the retail server, the current inventory value for the item; and initiating the purchase of the item in response to determining the item is available based upon the received current inventory value for the item.

10. The non-transitory computer-readable medium of claim 9, wherein initiating the purchase of the item includes transmitting, from the shopping platform to the retail server, the request to purchase the item, the method further comprising:

updating the estimated inventory value for the item based upon the purchase of the item and the received current inventory value for the item.

11. The non-transitory computer-readable medium of claim 9, wherein initiating the purchase of the item includes adding the item to an electronic shopping cart.

12. The non-transitory computer-readable medium of claim 9, the method further comprising:

receiving, by the shopping platform from the user device, a request to initiate a purchase of another item;

transmitting, from the shopping platform to a retail server in response to the received request to initiate the purchase of the other item, a request for a current inventory value for the other item;

receiving, by the shopping platform from the retail server, the current inventory value for the other item; and transmitting a message to the user device indicating that the other item is unavailable based upon the received current inventory value for the other item.

13. The non-transitory computer-readable medium of claim 9, wherein the history of inventory values for the item includes the inventory values obtained by the shopping platform regularly receiving the periodic inventory values for the item from the one or more third-party retailers.

14. The non-transitory computer-readable medium of claim 9, wherein the shopping platform uses the periodic inventory values for the item received from the second third-party retailer in response to determining the first and second third-party retailers have similar histories of inventory values for the item.

15. The non-transitory computer-readable medium of claim 9, wherein the shopping platform maintains the estimated inventory value for the item based upon periodic inventory values for another item.

16. The non-transitory computer-readable medium of claim 9, the method further comprising:
   determining that the estimated inventory for the item is below a threshold inventory value; and
   transmitting a notification to a user device corresponding to a likelihood of depleted inventory of the item.

17. A shopping platform apparatus comprising:
   a processing device; and
   a memory coupled to the processing device, the memory storing instructions which, when executed by the processing device, cause the apparatus to:
      receive, by the shopping platform from a user device, a browsing request to view an item offered by a first third-party retailer;
      retrieve an estimated inventory value for the item at the first third-party retailer, wherein the shopping platform maintains the estimated inventory value for the item using a combination of a history of purchases of the item by users of the shopping platform and a history of inventory values for the item received from one or more third-party retailers, and wherein the shopping platform uses periodic inventory values for the item received from a second third-party retailer to determine the estimated inventory value for the item at the first third-party retailer;
      transmit, from the shopping platform to the user device, a representation of the item as being available for purchase based upon the estimated inventory value for the item;
      receive, by the shopping platform from the user device, a request to initiate a purchase of the item in response to the transmitted representation of the item;
      in response to receiving the request to initiate the purchase of the item, transmit, from the shopping platform to a retail server, a request for a current inventory value for the item;
      receive, by the shopping platform from the retail server, the current inventory value for the item; and
      initiate the purchase of the item in response to determining the item is available based upon the received current inventory value for the item.

18. The apparatus of claim 17, wherein initiating the purchase of the item includes transmitting, from the shopping platform to the retail server, the request to purchase the item, and wherein execution of the instructions further cause the apparatus to:
   update the estimated inventory value for the item based upon the purchase of the item and the received current inventory value for the item.

* * * * *